United States Patent
Deshpande et al.

(10) Patent No.: US 12,452,086 B2
(45) Date of Patent: Oct. 21, 2025

(54) SYSTEM AND METHOD FOR ESTABLISHING DYNAMIC DIGITAL IDENTITY

(71) Applicant: FORTYTWO42 LABS LLP, Pune (IN)

(72) Inventors: Sanjay Deshpande, Pune (IN); Anil Kumar Pradhan, Dhenkanal (IN); Mohit Badhe, Jalgaon (IN)

(73) Assignee: FORTYTWO42 LABS LLP, Pune (IN)

( * ) Notice: Subject to any disclaimer, the term of this patent is extended or adjusted under 35 U.S.C. 154(b) by 584 days.

(21) Appl. No.: 17/797,246

(22) PCT Filed: Apr. 15, 2021

(86) PCT No.: PCT/IN2021/050374
§ 371 (c)(1),
(2) Date: Aug. 3, 2022

(87) PCT Pub. No.: WO2021/220292
PCT Pub. Date: Nov. 4, 2021

(65) Prior Publication Data
US 2023/0055655 A1    Feb. 23, 2023

(30) Foreign Application Priority Data
Apr. 27, 2020 (IN) ............... 202021017868

(51) Int. Cl.
*H04L 9/00* (2022.01)
*G06F 16/23* (2019.01)
(Continued)

(52) U.S. Cl.
CPC ............ *H04L 9/50* (2022.05); *G06F 16/2379* (2019.01); *H04L 9/3239* (2013.01); *H04L 9/3247* (2013.01)

(58) Field of Classification Search
CPC ....... H04L 9/50; H04L 9/3239; H04L 9/3247; G06F 16/2379; G06F 21/6218; G06F 21/31
See application file for complete search history.

(56) References Cited

U.S. PATENT DOCUMENTS 9,635,000 B1 * 4/2017 Muftic ................. H04L 9/3239
9,806,890 B2   10/2017 Ibraimi et al.
(Continued)

FOREIGN PATENT DOCUMENTS

EP    2572471 A1    3/2013
EP    3640833 A1    4/2020

OTHER PUBLICATIONS

International Search Report and Written Opinion for related International Application No. PCT/IN2021/050374 mailed Aug. 19, 2021.

*Primary Examiner* — Robert W Beausoliel, Jr.
*Assistant Examiner* — Mohammad S Bhuyan
(74) *Attorney, Agent, or Firm* — Renner, Otto, Boisselle & Sklar, LLP

(57) ABSTRACT

The present invention provide a method and system related to e-security, digital ecosystem more particularly the present invention provides a method and system for Establishing Dynamic Digital Identity. The system and method thereof of present invention creates and maintains events and authenticity of the event, captures at least one ordered set of a plurality of attributes resultant of at least one set of events an entity goes through and store and communicate said attributes data, event data respective to said entity, stores and maintains records of present dynamic digital identity of the each entity, executes at least one transition function to generate hash value of the attribute data and event data by processing the attribute data and event data through at least one cryptographic hash function, process the present
(Continued)

dynamic digital identity and the latest determined hash value to generate new dynamic digital identity of the entity.

21 Claims, 6 Drawing Sheets

(51) Int. Cl.
    *G06F 21/31*     (2013.01)
    *G06F 21/62*     (2013.01)
    *H04L 9/32*     (2006.01)

(56) References Cited

U.S. PATENT DOCUMENTS

| | | | |
|---|---|---|---|
| 11,048,794 B1* | 6/2021 | Bordow | H04L 63/102 |
| 2010/0250618 A1* | 9/2010 | Ourega | G06F 16/958 |
| | | | 709/204 |
| 2018/0234433 A1* | 8/2018 | Oberhauser | G06Q 20/02 |
| 2019/0089711 A1* | 3/2019 | Faulkner | H04L 63/1433 |
| 2020/0125725 A1* | 4/2020 | Petersen | H04L 43/065 |
| 2021/0314305 A1* | 10/2021 | Rodriguez | H04L 67/306 |

* cited by examiner

SYSTEM AND METHOD FOR ESTABLISHING DYNAMIC DIGITAL IDENTITY

This application is a national phase of International Application No. PCT/IN2021/050374 filed 15 Apr. 2021, which claims priority to India application No. 202021017868 filed 27 Apr. 2020, the entire disclosures of which are hereby incorporated by reference.

BACKGROUND

A. Technical Field

The present disclosure relates to cryptography and e-security, more particularly the disclosure relates to a method and system for Establishing Dynamic Digital Identity.

B. Background Art

With the advent of technology the digital revolution is without a doubt the most significant event in information dissemination and marks a much bigger shift in communication. The digital world has grown to become crucial to the functioning of society. The growing of demand for the huge data transmission made the digital communication systems increasingly attractive, and greatest of communications have become digital. Thus, there arises urgent need for identity and access to systems that balance privacy, civil liberties and security. Digital identification, or "digital ID," can be authenticated unambiguously through a digital channel, unlocking access to various services and information. The risks and potential for misuse of digital ID are real and deserve careful attention. When well-designed, digital ID not only enables civic and social empowerment, but also makes possible real and inclusive economic gains As digital identities proliferate and spark fierce debate, shared principles are more important than ever.

Digital identity and access systems can unlock a range of basic and empowering services for individuals. Digital identities and access systems are foundational elements of our shared digital future. Digital identity is the foundation of digital security. They offer tremendous opportunities for individuals and society, especially for those without formal ID. Additionally, it needs to be ensured that new approaches are being laid in a sustainable, inclusive and trustworthy manner. With the use of digital technologies across the world at an all-time high, and with the adoption of the internet of things expected to connect past 200 billion devices to the internet by 2021, the scope of identity management is also fast expanding to devices and legal entities.

Digital identity of an Entity is a representation of an Individual/Organization in the digital environment. There are various means and ways to establish the identity of an entity.

Establishing a strong digital identity which will satisfy the characteristics such as Unique, Provable Association, Dynamic, Non-deniable, Interoperable, Self-Sovereign, Decentralized etc. has been a point of discussion and a problem faced in the digital environment.

Further, use of list of ordered items for representing a digital identity and doing operations like identification, authentication, authorization etc is not very easy. Things get complicated when evolving nature of identity comes to the picture. The size of ordered list increases with time as new attributes get added to the identity. It would be extremely difficult to manage such dynamic nature of identity.

For example an enterprise needs to authenticate its customers (identities) before providing services to them. However, authenticating identity requires authenticating each attribute in the identity which will make the process extremely slow and lengthy. It will hugely affect the whole transaction mainly when the customer needs to use the services very frequently.

Individual organizations follow different approaches for solving the problem. Most common approach is to generate a single unique (sometimes random, sometimes sequential 1) string that is bound or mapped to a list of attributes (e.g. customer-id, account no, DoB all bound together to create a single string) and use it as an identity and identifier for entity.

EP 2572471 A1 discloses an attribute-based digital signature system comprising a signature generation unit (1) for signing a message (m) by generating a signature ($\sigma$) based on a user secret key (SK) associated with a set of user attributes. The signature generation unit (1) is arranged for combining the user secret key (SK) with revocation data (R) to form at least part of the signature ($\sigma$), wherein the revocation data (R) complements respective ones of a plurality of valid user secret keys and wherein the revocation data (R) prevents a revoked user secret key (SK) from being used to validly sign a message (m) with the set of user attributes. The system further comprises a revocation unit (2) for selectively removing at least part of the signing capability of a to-be-revoked user secret key (SK), by generating updated revocation data (R), wherein the updated revocation data (R) is based on at least part of the to-be-revoked user secret key (SK). A plurality of attribute authorities 301 may independently issue cryptographic keys Digital entity solutions available today are listed below:

LDAP: Some enterprises create a random string (customer-id/account number) to use it as digital identity and ask the customers to use that string for authenticating themselves. In the backend then create a database mapping between identity and the new string. As the enterprise creates the string they have the option to make it unique and they ensure this part. But because it is a database binding it is prone to tampering of information. Also, there is no provable binding between the identity and random string, so it can not possess the non-deniable property.

PKI Certificate: A better way is to cryptographically bind the identity (attribute list) and digital identity. So, a trusted third party (TTP) creates a digital document that contains the identity and a random string called "Public Key". They call this document PKI Certificate. This public key is further used for authentication. The measure issue with this approach is that this trusted third party is given major power or control along with responsibility.

Given that the certificate is tamper proof and the binding better than Database binding, but allows the TTP to create fake certificates which is equivalent to fake identity.

While these digital identity systems and method thereof exist, there is no single system and method thereof that is tamper proof, does not allow duplication or creation of fake identity, does not allow backtracking the seed of the identity generation and encryption and does not dependent on any mathematical algorithms that to be left for any prediction-based attacks on the same.

Hence, there is a need for a digital identity generation system and method thereof that is tamper proof, does not allow duplication or creation of fake identity, does not allow backtracking the seed of the identity generation and encryption, generates digital identity which is in full control of the owner entity of the generated digital identity and enables the owner of the identity and general user to exchange the data and information securely. Further, the system and method thereof shall be capable of providing enhanced application security and functional facilities to the digital identity owners and the users of the information.

For the reasons stated above, which will become apparent to those skilled in the art upon reading and understanding the specification, there is a need in the art for a system and method for digital identity creation, a system and method thereof for creation of dynamic digital identity for sharing, communicating data and information among the creators/owners/users of the data and information with effective enhanced security of data/information communicated, that is useable, scalable and independent of new technology platforms, uses minimum resources that is easy and cost effectively maintained and is portable and can be deployed anywhere in very little time.

Proposed invention overcomes these lacunae by proposing a unique system and methodology implemented thereof to create a Dynamic Digital Identity as detailed hereinafter.

SUMMARY OF THE INVENTION

The present invention provide a method and system related to cryptography and e-security, more particularly the present invention provides a method and system for Establishing Dynamic Digital Identity.

The present invention discloses a method for creation of dynamic digital identity for at least one entity. The present invention discloses a method for creation of dynamic digital identity for at least one entity based on Identity Chaining Machine, an infinite state machine. The method includes creating and maintaining at least one event involving at least one entity by the event management module. The method includes maintaining authenticity, integrity, and non-deniability of the events created. The method includes storing and maintaining records of present dynamic digital identity of each entity by entity representation module. The method includes capturing at least one attribute resultant of at least one event that entity goes through by entity representation module. The method includes capturing at least one event that entity goes through that does not result any attribute by entity representation module. The method includes receiving at least one attribute data resultant of at least one event and at least one event data at the identity module. The method includes generating a hash value of the attribute data and event data by processing through transition function by a first processor of the identity module the attribute data and event data through at least on cryptographic function by an identity module. The method includes receiving a present dynamic digital identity of the entity at the identity module from the entity representation module. The method includes generating new dynamic digital identity of the entity by processing through transition function by a second processor of the identity module the present dynamic digital identity and the latest determined hash value of the attribute data and event data by the identity module. Further, the method includes communicating the new dynamic digital identity of the entity to the entity representation module to update the dynamic digital identity record of said entity. Further, the process steps to generate new dynamic digital identity are repeated upon measuring and recording a new event respective to an entity under consideration at the event management module.

The system of present invention comprises an event management module for creating and maintaining events and authenticity of the event, an entity representation module for capturing at least one ordered set of a plurality of attributes resultant of at least one set of events an entity goes through and store and communicate said attributes data, event data respective to said entity, storing and maintaining records of present dynamic digital identity of the each entity, an identity module implementing an identity chaining machine and configured to execute at least one transition function to generate hash value of the attribute data and event data by processing the attribute data and event data through at least one cryptographic hash function, process the present dynamic digital identity and the latest determined hash value to generate new dynamic digital identity of the entity.

DETAILED DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and modules.

Figure 1:
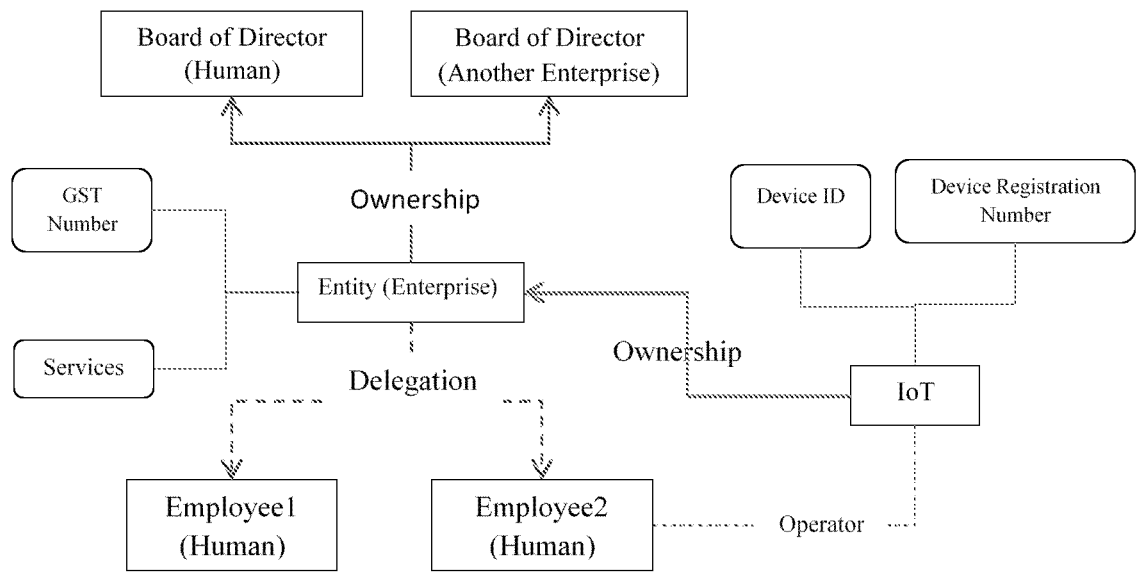
FIG. 1 illustrates an example attribute graph according to an exemplary implementation of the present invention.

It should be appreciated by those skilled in the art that any block diagrams herein represent conceptual views of illustrative systems embodying the principles of the present invention. Similarly, it will be appreciated that any flowcharts, flow diagrams, and the like represent various processes which may be substantially represented in computer readable medium and so executed by a computer or processor, whether or not such computer or processor is explicitly shown.

DETAILED DESCRIPTION OF THE INVENTION

The embodiments herein provide a method and system related to cryptography and e-security, more particularly the embodiments of the present invention provides a method and system for Establishing Dynamic Digital Identity. Further the embodiments may be easily implemented in data security and management structures. Embodiments may also be implemented as one or more applications performed by stand alone or embedded systems.

The systems and methods described herein are explained using examples with specific details for better understanding. However, the disclosed embodiments can be worked on by a person skilled in the art without the use of these specific details.

Throughout this application, with respect to all reasonable derivatives of such terms, and unless otherwise specified (and/or unless the particular context clearly dictates otherwise), each usage of:

"a" or "an" is meant to read as "at least one."

"the" is meant to be read as "the at least one."

References in the specification to "one embodiment" or "an embodiment" mean that a particular feature, structure, characteristic, or function described in connection with the embodiment is included in at least one embodiment. The appearances of the phrase "in one embodiment" in various places in the specification are not necessarily all referring to the same embodiment.

Hereinafter, embodiments will be described in detail. For clarity of the description, known constructions and functions will be omitted.

Parts of the description may be presented in terms of operations performed by at least one electrical/electronic circuit, a computer system, using terms such as data, state, link, fault, packet, and the like, consistent with the manner commonly employed by those skilled in the art to convey the substance of their work to others skilled in the art. As is well understood by those skilled in the art, these quantities take the form of data stored/transferred in the form of non-transitory, computer-readable electrical, magnetic, or optical signals capable of being stored, transferred, combined, and otherwise manipulated through mechanical and electrical components of the computer system; and the term computer system includes general purpose as well as special purpose data processing machines, switches, and the like, that are standalone, adjunct or embedded. For instance, some embodiments may be implemented by a processing system that executes program instructions so as to cause the processing system to perform operations involved in one or more of the methods described herein. The program instructions may be computer-readable code, such as compiled or non-compiled program logic and/or machine code, stored in a data storage that takes the form of a non-transitory computer-readable medium, such as a magnetic, optical, and/or flash data storage medium. Moreover, such processing system and/or data storage may be implemented using a single computer system or may be distributed across multiple computer systems (e.g., servers) that are communicatively linked through a network to allow the computer systems to operate in a coordinated manner.

The present invention is related to enhancing the Cryptographic e-security of identity of an entity over the communication and activities the entity involved in, by adopting at least one identity infinite state machine having transition series and present dynamic digital identity state to process the present dynamic digital identity and the latest determined hash value of the attribute data and event data to generate new dynamic digital identity of the entity.

The Cryptographic e-security is very important in the sensitive data transmission or communication over the internet. The hardness of this dynamic digital identity generation system and method thereof is proved to be used for the securing the real time dynamic digital identity of an entity in Transit and at Rest.

Nomenclature as Used Herein:

i. E is an entity.

ii. $\{e_1, \ldots, e_m\}$ are events in which E is involved ordered according to the time of occurrence iii. $\{a_1, \ldots, a_n\}$ are attributes of E ordered according to the time of creation of those attributes iv. $\mu(a)$ is the accuracy of measurement v. $f(\square)$ is a collision resistant one-to-one, one-way function. That means $f(x)=f(y)$ if and only if $x=y$ or it is computationally (or in any other way) difficult to find a pair x, y such that $f(x)=f(y)$ [Collision Resistance]

Given definition off and the value $z=f(x)$ it is extremely difficult (computationally or in any other way) to recover x from $z=f(x)$.

Assumption: There is a unique provable association between entity E and $\{a_1, \ldots, a_n, e_1, \ldots, e_m\}$ vi. I-AM is Cryptographic Dynamic Digital Identity or I-AM Crypto-ID Embodiments recognize and take into account that Digital identity of an Entity is a representation of an Individual/Organization in the digital environment. There are various means and ways to establish the identity of an entity.

In an implementation, according to an exemplary embodiment an entity can be uniquely identified by its Attributes. For example a human entity can be described by these attributes: name (e.g. Ram), appearance (e.g. height, skin colour), sex (male/female), its actions (e.g. Job), behaviours (e.g. eating habits), beliefs (e.g. spiritual/atheist), its possession of assets and many more. An object say car can be described by its colour, brand (describes its creator), model, features (describes its capabilities), Owner, Vehicle Number (assigned by RTO) etc.

FIG. 1 illustrates an example attribute graph according to an exemplary implementation of the present invention. As depicted in figure the entity 'Enterprise' have attributes GST Number, Services, Board of Director etc. and the entity 'IoT' have attributes Device ID, Device Registration Number etc.

Figure 2:
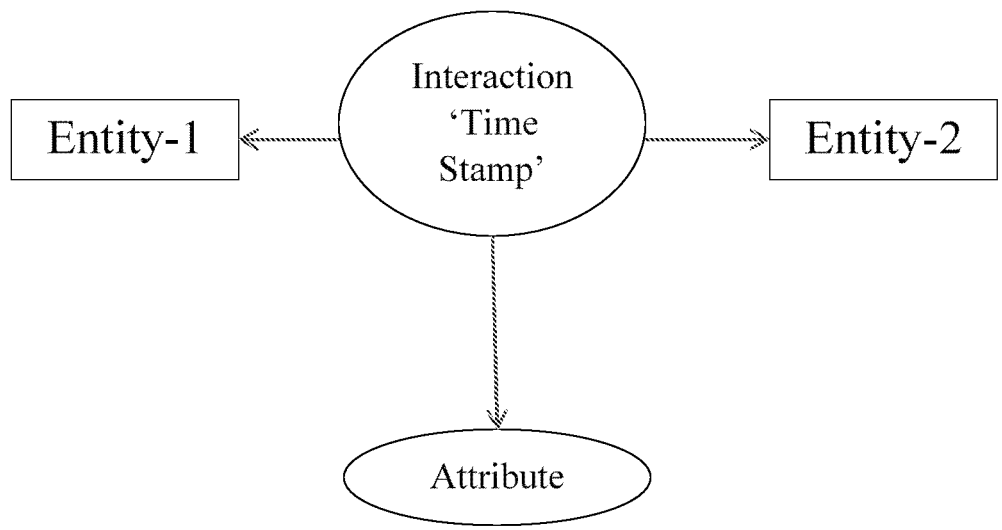
FIG. 2 illustrates a flow diagram depicting that attributes are the results of events according to an exemplary implementation of the present invention.

In an implementation, according to an exemplary embodiment a plurality of Attributes of an entity are the consequence of it's at least one interaction event at particular time with self or other entities. That is to say attributes are the results of events as depicted in FIG. 2. For example consider two people Sita & Ram interact with each other. The interaction process consists of the following steps:

"Sita mentioned her date of birth (with evidence). Knowing the date of birth Ram followed the basic calculation method to calculate the age of Sita say 22."

This interaction gives out the attribute "Age" for Sita. The whole event can be represented as a tuple: (Sita, [Age: 22], Evidence, Ram) Or more formally we can write the event as follows:

```
{
    Entity: Sita
    Entity: Ram
    Attribute Name: Age
    Attribute Value: 22
    Reference: DOB
}
```

The event is consists of all the entities involved in it and the resulting attributes. In general an event is formally represented as follows:

$$\begin{bmatrix} \text{List of Entities Involved:} & E_1, E_2, \ldots, E_n \\ \text{Resulting Attributes:} & A_1, A_2, \ldots, A_n \\ \text{Time Stamp:} & t1, t2, \ldots, tn \end{bmatrix}$$

According to one of the embodiments of the present invention an I-AM the Dynamic Digital Identity generated of an entity is characterized as Unique: The identity is unique. Two different entities who create digital identities with the method cannot obtain same digital identity.

Provable Association: There is a provable association between the entity and the digital identity.

Dynamic: The identity changes over time as the entity evolves with new characteristics.

Non-deniable: The entity cannot deny its association with the digital identity or any claims made or authorized by the digital identity (in digital world).

Interoperable: The identity can be used by multiple systems, organizations and authentication methods (algorithms) to identify and/or authenticate the entity.

Self-Sovereign: The entity has full control over the identity all the time.

Decentralized: The entity does not need to depend on any particular organization or group of organizations to create the identity.

The illustrative embodiments of the present invention provides a method and system to create strong, unique, dynamic, interoperable dynamic digital identities for entities from their respective attributes such that the association between entity and identity is provable, the entity cannot deny its association with the identity, and the entity has full control over the identity.

In illustrative embodiments, the present invention provides a system and method thereof that establishes dynamic digital identity for an entity from its attributes arranged according to the time they are created/measured.

The identity is an ordered list of events and attributes. The events and attributes are ordered according to the time of the occurrence/creation of event/attribute and they are unique to each entity. This ordered list of events and attributes in a way defines the entity, so there is a provable association between the entity and the ordered list. All the events, attributes and their order are only known to the entity associated with it.

The Dynamic Digital identity thus created possesses certain properties: uniqueness, provable association with the entity, non-deniable association with entity, self-sovereign in nature and decentralized. It fully mirrors the entity. There is no limitation to the type of entity as it can be anyone or anything such as humans, software, devices or IoT etc. The system and method of the present invention chains the attributes of an entity in the order of the measurement of those attributes through a family of functions that chains the attributes of an entity in the order of the measurement of those attributes. This establishes a strong provable association between the entity and the created digital identity. The Model is implemented using an infinite state machine called "I-AM Identity Machine/I-AM Attribute Chaining Machine/Identity Chaining Machine".

According to an embodiment the present invention provides a method to create dynamic digital identity called 'I-AM'. It can be used independently by any entity to create dynamic digital identity. An "interaction between two entities" is denoted as an "Event". The method is built upon the following laws of identity:

An entity comes to an existence only when it interacts with another entity (or self).

Every entity has an identity that is a result of all its interactions.

The identity of an entity changes only when it interacts.

In an implementation according to an embodiment of the present invention, the system and method thereof executes the steps of representing the events, collecting and managing events and determining the dynamic digital identity from these events. An entity E goes through set of events that results in an ordered set of attributes $\{a_1, \ldots, a_n\}$ and another set of events $\{e_1, \ldots, e_m\}$ that does not result any attribute. In some cases an event may not result an attribute. The event might be a trivial interaction. Although the event does not generate an attribute it does make changes to the identity. This event itself is considered as an attribute while determining the identity.

Hence, identity of an entity will be a function of all events in which the entity is involved and all attributes that are created or measured.

Although all events and attributes are part of the identity, when the identity is created subject to a specific context, only a subset of these events and attributes are considered which are relevant to that context.

Events and Attributes (e and a) are created/measured at different time 't' with accuracy $\mu(a)$.

Attribute would be represented by these 3 parameters as attribute a measured at time t with degree of accuracy $\mu(a)$: [t, a, $\mu(a)$]

Event would be represented by these 3 parameters as event e occurred at time t with degree of accuracy $\mu(e)$: [t, e, $\mu(e)$]

The degree of accuracy ranges from 0 to 1, 1 implies that the measurement is 100% correct and 0 says that the measurement is absolutely wrong. Adding time and degree of accuracy increases the chance of finding sufficient difference from other entity and uniqueness of identity for each entity. With attributes are arranged according to the time i.e. where the attributes are ordered, the parameter t would become redundant.

An entity E has attributes $a_1, \ldots, a_n$ with degree of accuracy $\mu(a_1), \ldots, \mu(a_n)$ respectively, arranged in the increasing order of time at which they were measured. The entity E also associated with events $e_1, \ldots, e_m$ with degree of accuracy $\mu(e_1), \ldots, \mu e_m)$ respectively, arranged in the increasing order of time at which they were measured. The Digital Identity 'I-AM' of entity E is defined in terms of an ordered set:—

$$\{(x,\mu(x)): x \in \{a_1, \ldots, a_n, e_1, \ldots, e_m\}\}$$

The set is ordered according to the time of occurrence (in case of event) or the time of creation/measurement (in case of attribute). The $i^{th}$ element of the ordered set is represented as $A_i = [x_i, \mu(x_i)]$ and here $x_i$ can be an attribute or an event. Then, the 'I-AM' identity would be represented as:—

$$(A_1, \ldots, A_{n+m})$$

According to one of the embodiment of the present invention the events are created and maintained. The events are created and maintained just after the interaction happened and are collectively signed (digitally) by all involved entities. The digital signature is used for maintaining authenticity, integrity and non-deniability of the event. Each involved entity keeps a copy of the event. The universal identity of an entity is consists of all possible events the entity participated.

$$(A_1, A_2, \ldots, A_N) \rightarrow \text{Digital Identity}$$

However to obtain customized identity the entity has the option to choose a particular subset of events while determining the identity depending on the context.

$$(A_{k_1}, A_{k_2}, \ldots, A_{k_n}) \rightarrow \text{Digital Identity}$$

The system and method thereof of present invention is built on the model that is based on the Memory-less-ness property which states that "the probability of transitioning to any particular state is dependent solely on the current state and time elapsed irrespective of how the system has arrived at the present state".

According to one of the embodiment of the present invention the transition function is defined as follows:

The transition function F( ) is a collision resistant, one-to-one, one-way function. That means One-to-One $F(x)=F(y)$ if and only if $x=y$ or Collision Resistance It is Deterministically (or in any other way) difficult to find a pair of distinct element x,y such that $F(x)=F(y)$ One-way Given definition of F and the value $z=F(x)$ it is extremely difficult (Deterministically or in any other way) to recover x.

An exemplary function is a cryptographic hash function. The cryptographic hash function (CHF) maps data of arbitrary size (often called the "message") to a bit array of a fixed size (the "hash value", "hash", or "message digest"). It is a one-way function, that is, a function which is practically infeasible to invert. Ideally, the only way to find a message that produces a given hash is to attempt a brute-force search of possible inputs to see if they produce a match, or use a rainbow table of matched hashes. Further in category are Cryptographic Hash Algorithm SHA-2 (Secure Hash Algorithm 2) and SHA-3 (Secure Hash Algorithm 3). The ideal cryptographic hash function has the following main properties:

- it is deterministic, meaning that the same message always results in the same hash
- it is quick to compute the hash value for any given message
- it is infeasible to generate a message that yields a given hash value (i.e. to reverse the process that generated the given hash value)
- it is infeasible to find two different messages with the same hash value
- a small change to a message should change the hash value so extensively that a new hash value appears uncorrelated with the old hash value (avalanche effect).

According to one of the embodiments of the present invention Determination of the Identity is based on Identity Chaining Machine, an infinite state machine.

To determine the identity, map the ordered set of attributes and events to a single fixed size string that will preserve all the properties described and apply the Determination function.

At time t, the Identity of an Entity E would be:

$$I_t = F(A_1, \ldots, A_t)$$

Where F could be any transition function, such as:

Cryptographic Hash Function: SHA256( )

At time t+1, a new event/attribute $A_{t+1}$ created/measured.

$$I_{t+1} = F(A_1, \ldots, A_t, A_{t+1})$$

This means to compute $I_{t+1}$ it needs to recollect all the events and attributes arranged in proper order. This process will repeat each time a new event/attribute gets added to the identity and the complexity of the process increases over time. The function F( ) has to be designed in such a way that it would be able to take dynamic value and compute the digital identity.

So it is not the best for determining digital identity of evolving nature which is where Identity Chaining model comes into play.

In an implementation according to an embodiment the present invention define an infinite state machine called "Identity Chaining Machine" for determining the identity of an entity.

The mechanism is defined as follows:

At the beginning of the model there is no event/attribute. So the initial identity is null:

$$I_0 = \text{NULL}$$

Start Step:

The machine starts when the first event/attribute is added and gives out the first identity of the entity.

$$I_1 \leftarrow F(I_0, A_1) = F(\text{NULL}, A_1)$$

Transition Step:

Suppose the machine is at a state $I_{k-1}$ that is a result of addition of (k−1) attributes and/or events. Whenever an attribute is added the machine makes a transition into a new state $I_k$ defined as follows $$I_k = F(I_{k-1}, A_k)$$

Here, the function F( ) is called "Transition function" which is already defined before.

Digital Identity:

At a particular time the final state of the machine gives out the Dynamic Digital Identity $I_k$ of the entity E.

Figure 3:
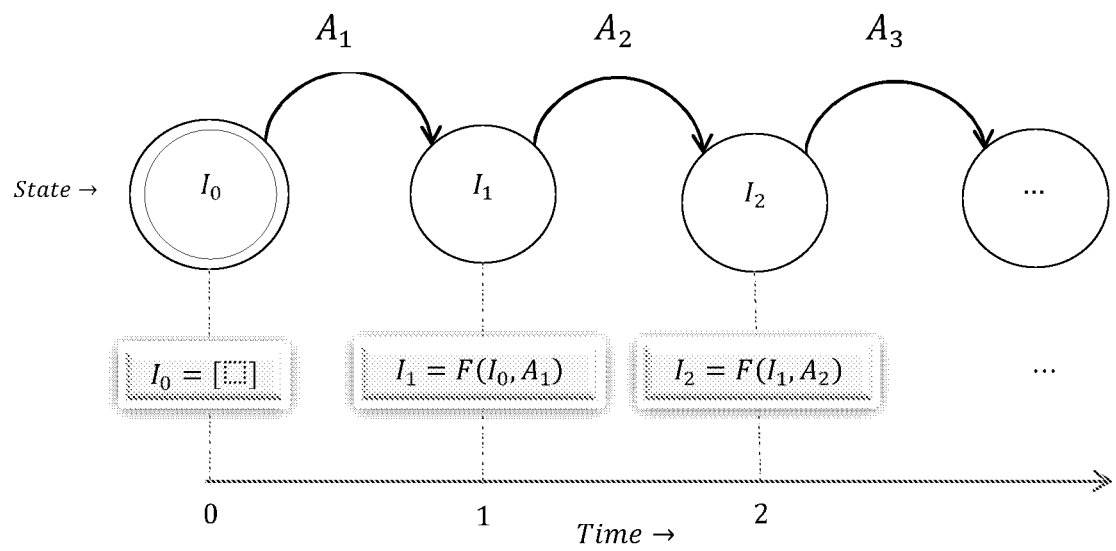
FIG. 3 illustrates implementation of identity chaining machine the infinite state machine according to one of the embodiments of the present invention.

The FIG. 3 illustrates the Identity Chaining machine model based on which the system and method thereof of present invention is built. The model is based on the Memory-less-ness property which states that "the probability of transitioning to any particular state is dependent solely on the current state and time elapsed irrespective of how the system has arrived at the present state". The FIG. 3 depicts state transition as below:

Start (State-0):

At the beginning of the model there is no event/attribute. So the initial identity is null. i.e.

$$I_0 = [\ ]$$

State-1:

$$I_1 = F(\text{NULL}, A_1) = F(I_0, A_2)$$

State-2:

$$I_2 = F(I_1, A_2) = F(F(I_0, A_1), A_2)$$

:

State-t:

$$I_{t+1} = F(I_t, A_{t+1}) = F(F(I_{t-1}, A_t), A_{t+1}), t \geq 2$$

The Transition Function $I_{t+i} = F(I_t, A_{t+i})$ is defined as above. FIG. 3 illustrates identity chaining machine model, the infinite state machine according to one of the embodiments of the present invention. An entity can keep adding events and attributes to its identity until it dies or gets destroyed. So the machine must have infinite states.

Identity Chaining Model of an infinite state machine is used for implementation of the said logic. The machine starts when the first event/attribute is added. It transitions into a new state which represents the identity of the entity, which is a function of the first attribute.

$$(I_0, A_1) \rightarrow I_1$$

$$I_1 = F(I_0, A_1)$$

Whenever a new event/attribute is added the state of the system changes based on the current identity/state and the new event/attribute. The state will draw no effect from any of the previous event/attributes added or states changed. Suppose the system is at a state $I_i$ which represents the identity of the entity, and a new event/attribute $A_{i+1}$ is added, then the system changes its state to $I_{i+1} \leftarrow (I_i, A_{i+1})$ and that becomes the new identity of the entity. The final state of the machine gives out the I-AM Digital Identity $I_n$ of the entity E.

Figure 4:
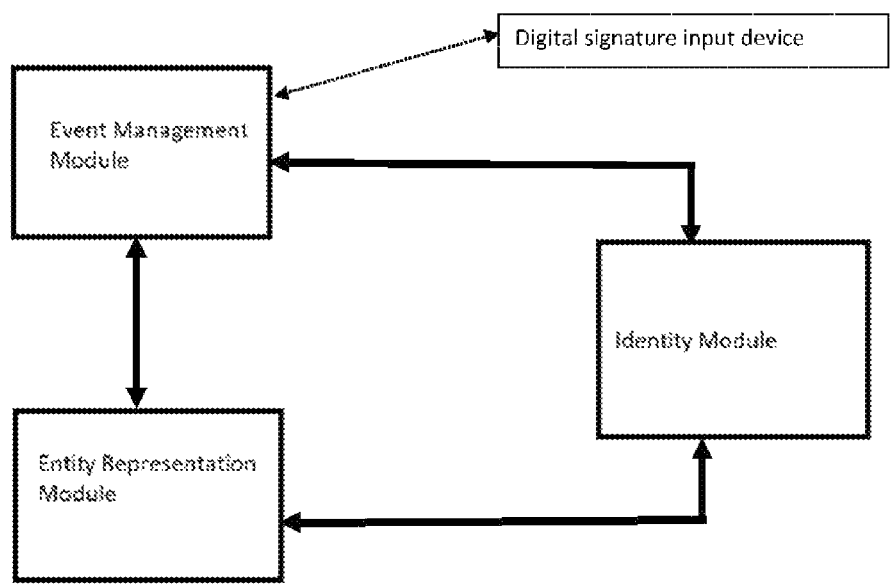
FIG. 4 illustrates a block diagram of a dynamic digital identity creation system of the present invention according to an embodiment of the present invention.

FIG. 4 illustrates a block diagram of a dynamic digital identity creation system of the present invention according to an embodiment of the present invention. The dynamic digital identity creation system comprise of an event management module for creating and maintaining events and authenticity of the event, an entity representation module for capturing at least one ordered set of a plurality of attributes resultant of at least one set of events an entity goes through and store and communicate said attributes data, event data respective to said entity, storing and maintaining records of present dynamic digital identity of the each entity, an identity module implementing an identity chaining machine and configured to execute at least one transition function to generate hash value of the attribute data and event data by processing the attribute data and event data through at least one cryptographic hash function, process the present dynamic digital identity and the latest determined hash value to generate new dynamic digital identity of the entity.

The dynamic digital identity creation system of the present invention according to an embodiment of the present invention as illustrated in the FIG. 4 implemented through the logic of Identity Chaining Model of an infinite state machine. The Identity Chaining Machine of the dynamic digital identity creation system starts when the first event/attribute is added. It transitions into a new state which represents the identity of the entity, which is a function of the first attribute.

$$(I_0, A_1) \rightarrow I_1$$

$$I_1 = F(I_0, A_1)$$

Whenever a new event/attribute is added the state of the system changes based on the current identity/state and the new event/attribute. The state will draw no effect from any of the previous event/attributes added or states changed. Suppose the system is at a state $I_i$ which represents the identity of the entity, and a new event/attribute $A_{i+1}$ is added, then the system changes its state to $I_{i+1}$ $(I_i, A_{i+1})$ and that becomes the new identity of the entity. The final state of the machine gives out the I-AM the Dynamic Digital Identity $I_n$ of the entity E.

Figure 5:
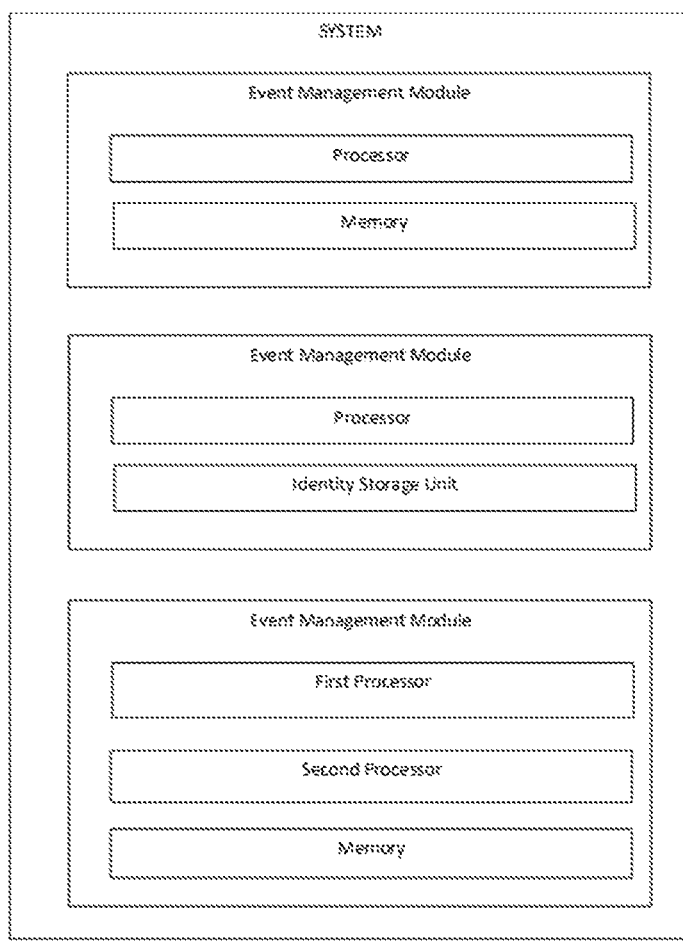
FIG. 5 illustrates the dynamic digital identity creation system in accordance with an embodiment of the present invention.

FIG. 5 illustrates the dynamic digital identity creation system in accordance with an embodiment of the present invention. The dynamic digital identity creation system comprise of an event management module comprising a processor and a memory communicatively coupled to the processor for creating and maintaining events and authenticity of the event, an entity representation module comprising a processor and an identity storage unit communicatively coupled to the processor for capturing at least one ordered set of a plurality of attributes resultant of at least one set of events an entity goes through and store and communicate said attributes data, event data respective to said entity, storing and maintaining records of present dynamic digital identity of the each entity, and an identity module implementing an identity chaining machine and configured to execute at least one transition function comprises a first processor, a second processor and a memory communicatively coupled to said first processor and said second processor to generate hash value of the attribute data and event data by processing the attribute data and event data through at least one cryptographic hash function, process the present dynamic digital identity and the latest determined hash value to generate new dynamic digital identity of the entity.

In an implementation according to one of the embodiments of the present invention, the dynamic digital identity creation system wherein the plurality of processors constituting various modules of the system of the present invention are embedded processors realized as ASIC processors, embedded processors configured on FPGA/CPLD, configurable and programmable general purpose processors configured to realized various modules of the system of the present invention.

In an implementation according to one of the embodiments of the present invention, the dynamic digital identity creation system comprises of an event management module comprising a processor and a memory communicatively coupled to the processor. The processor of the event management module is configured to create and maintain events involving at least one entity based on the input interaction data from the at least one entity involved in the interaction. The processor of the event management module is further configured to maintain authenticity, integrity and non-deniability of the event.

In an implementation according to one of the embodiments of the present invention, the event management module of the dynamic digital identity creation system through the processor configured to maintain authenticity, integrity and non-deniability of the event, maintains the authenticity, integrity and non-deniability of the event by accepting by said processor collectively a plurality of digital signatures of all the involved entities when the event is created, from at least one digital signature input device.

In an implementation according to one of the embodiments of the present invention, the dynamic digital identity creation system comprises of an entity representation module comprising a processor and an identity storage unit communicatively coupled to the processor. The processor of the entity representation module is configured to capture at least one ordered set of a plurality of attributes resultant of at least one set of events an entity goes through and store said attributes data, event data respective to said entity at the identity storage unit. The plurality of attributes are created, measured at different time 't' with a degree of accuracy $\mu(a)$. The processor of the entity representation module is configured to capture at least one set of events that does not result any attributes and store said events data respective to said entity at the identity storage unit. The at least one set of events are occurred and measured/recorded at time 't' with a degree of accuracy $\mu(e)$. Further, the processor of the entity representation module is configured to communicate attributes data specific to events and the events information to other modules and blocks of the system. Also, the processor of the entity representation module is configured to store and maintain records of present identity of the each entity at the identity storage unit.

In an implementation according to one of the embodiments of the present invention, at the dynamic digital identity creation system the each attribute of the plurality of attributes is represented by three parameters as attribute a measured at time t with degree of accuracy $\mu(a)$: [t, a, $\mu(a)$].

In an implementation according to one of the embodiments of the present invention, at the dynamic digital identity creation system the each event of the plurality of events is represented by three parameters as event e occurred at time t with degree of accuracy µ(e): [t, e, µ(e)].

In an implementation according to one of the embodiments of the dynamic digital identity creation system of present invention the degree of accuracy in the measurement of attributes and events ranges from 0 to 1, 1 implies that the measurement is 100% correct and 0 says that the measurement is absolutely wrong. Further, adding time and degree of accuracy to the measurement of the plurality of attributes and plurality of events increases the probability of finding sufficient difference from other entity and uniqueness of dynamic digital identity for each entity.

In an implementation according to one of the embodiments of the present invention, the dynamic digital identity creation system comprise of an identity module implementing an identity chaining machine and configured to execute at least one transition function comprising a first processor, a second processor and a memory communicatively coupled to said first processor and said second processor. The first processor of the identity module implementing an identity chaining machine is configured to receive at least one attribute data resultant of at least one event from the entity representation module, receive at least one event data that does not result any attribute from the entity representation module. The first processor of the identity module implementing an identity chaining machine is configured to execute, a transition function to generate hash value of the attribute data and event data by processing the attribute data and event data through at least one cryptographic hash function. The second processor of the identity module implementing an identity chaining machine implements the identity chaining machine having transition series and present dynamic digital identity state. The second processor of the identity module implementing the identity chaining machine having transition series and present dynamic digital identity state is configured to receive as a state transition input parameter a present dynamic digital identity of the entity from the entity representation module, receive as a state transition input parameter the latest determined hash value of the attribute data and event data from the first processor. The second processor of the identity module implementing the identity chaining machine having transition series and present dynamic digital identity state is configured to execute, a transition function through application of at least one operator to process the received plurality of state transition input parameters to generate new dynamic digital identity of the entity. The second processor of the identity module implementing the identity chaining machine having transition series and present dynamic digital identity state is configured to execute, a transition function through application of at least one operator to process the received plurality of state transition input parameters such as present dynamic digital identity and the latest determined hash value to generate new dynamic digital identity of the entity. Further, the second processor of the identity module is configured to communicate the new dynamic digital identity of the entity to the entity representation module to update the dynamic digital identity record of said entity wherein the newly generated dynamic digital identity is recorded as the present dynamic digital identity of the respective entity.

In an implementation according to one of the embodiments of the present inventin, The second processor of the identity module implementing the identity chaining machine having transition series and present dynamic digital identity state is configured to execute a transition function through application of concatenation operator, logical operators or any combination of said operators to process the received plurality of state transition input parameters such as present dynamic digital identity and the latest determined hash value to generate new dynamic digital identity of the entity.

In an implementation according to one of the embodiments of the present invention, the dynamic digital identity creation system comprise of an identity module implementing an identity chaining machine and configured to execute at least one transition function comprising a processor and a memory communicatively coupled to said processor. The processor of the identity module implementing an identity chaining machine having transition series and present dynamic digital identity state is configured to receive at least one attribute data resultant of at least one event from the entity representation module, receive at least one event data that does not result any attribute from the entity representation module. The processor of the identity module implementing an identity chaining machine having transition series and present dynamic digital identity state is configured to execute, a transition function to generate hash value of the attribute data and event data by processing the attribute data and event data through at least one cryptographic hash function. The processor of the identity module implementing an identity chaining machine implements the identity chaining machine having transition series and present dynamic digital identity state is configured to receive as a state transition input parameter a present dynamic digital identity of the entity from the entity representation module, receive as a state transition input parameter the latest determined hash value of the attribute data and event data. The processor of the identity module implementing the identity chaining machine having transition series and present dynamic digital identity state is configured to execute, a transition function through application of at least one operator to process the received plurality of state transition input parameters to generate new dynamic digital identity of the entity. The processor of the identity module implementing the identity chaining machine having transition series and present dynamic digital identity state is configured to execute, a transition function through application of at least one operator to process the received plurality of state transition input parameters such as present dynamic digital identity and the latest determined hash value to generate new dynamic digital identity of the entity. Further, the processor of the identity module is configured to communicate the new dynamic digital identity of the entity to the entity representation module to update the dynamic digital identity record of said entity wherein the newly generated dynamic digital identity is recorded as the present dynamic digital identity of the respective entity.

Figure 6:
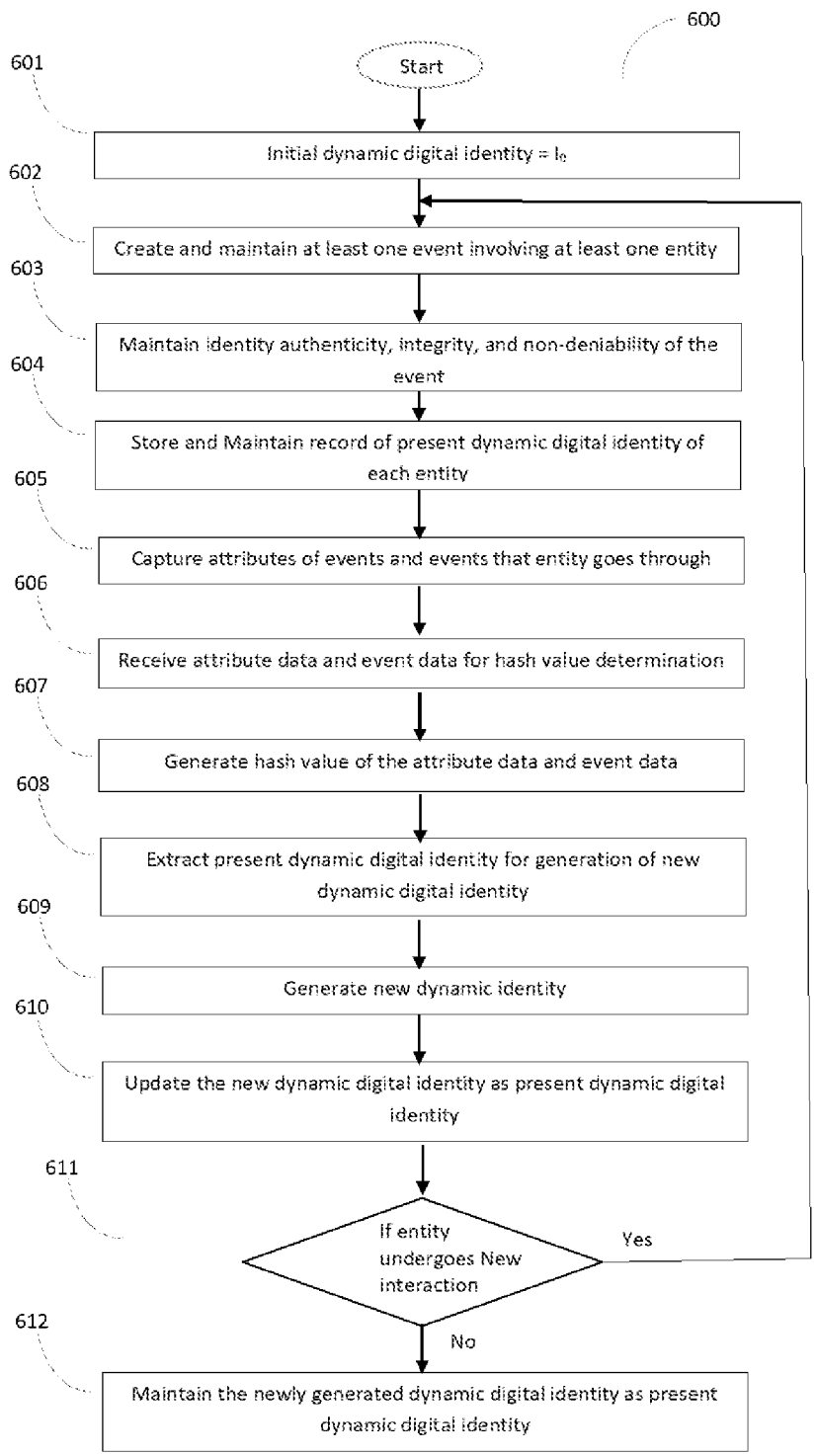
FIG. 6 illustrates a method for creation of dynamic digital identity for at least one entity in accordance with one of the embodiments of the present invention.

The FIG. 6 illustrates a method for creation of dynamic digital identity for at least one entity (600) in accordance with one of the embodiments of the present invention. In one of the implementations, the present invention discloses a method for creation of dynamic digital identity for at least one entity (600). The present invention discloses a method for creation of dynamic digital identity for at least one entity based on Identity Chaining Machine, an infinite state machine. The method includes at step (602) creating and maintaining at least one event involving at least one entity by the event management module. The method includes at step (603) maintaining identity, authenticity, integrity, and non-deniability of the events created. The method includes at step (604) storing and maintaining records of present dynamic digital identity of each entity by entity representation module. The method includes at step (605) capturing at least one attribute resultant of at least one event that entity goes through by entity representation module. The method includes at step (605) capturing at least one event that entity goes through that does not result any attribute by entity representation module. The method includes at step (606) receiving at least one attribute data resultant of at least one event and at least one event data at the identity module. The method includes at step (607) generating a hash value of the attribute data and event data by processing through transition function by a first processor of the identity module the attribute data and event data through at least on cryptographic function by an identity module. The method includes at step (608) receiving a present dynamic digital identity of the entity at the identity module from the entity representation module. The method includes at step (609) generating new dynamic digital identity of the entity by processing through transition function by a second processor of the identity module the present dynamic digital identity and the latest determined hash value of the attribute data and event data by the identity module. Further, the method includes at step (610) communicating the new dynamic digital identity of the entity to the entity representation module to update the dynamic digital identity record of said entity. Further, at step (612) the process steps to generate new dynamic digital identity are repeated upon at step (611) measuring and recording a new event respective to an entity under consideration at the event management module.

In another implementation in the step of creating and maintaining at least one event involving at least one entity by the event management module the events created and maintained by the event management module involving at least one entity are based on the input interaction data from the at least one entity involved in the interaction.

In another implementation the step of maintaining identity, authenticity, integrity, and non-deniability of the event includes steps of collectively signing (digitally) the occurrence of event by all involved entities using digital signatures which is recorded at the event management module. The event management module of the dynamic digital identity creation system through the processor configured accepts collectively a plurality of digital signatures of all the involved entities when the event is created, from at least one digital signature input device to maintain identity, authenticity, integrity and non-deniability of the event.

In another implementation the step of creating and maintaining at least one event involving at least one entity by the event management module includes the step of arranging the events by the event management module in the increasing order of time at which said events were measured.

In another implementation the step of capturing at least one attribute resultant of at least one event that entity goes through includes step of representing each attribute of the plurality of attributes by three parameters as attribute a measured at time t with degree of accuracy $\mu(a)$: $[t, a, \mu(a)]$.

In another implementation the step of capturing at least one event that entity goes through that does not result any attribute includes step of representing the each event of the plurality of events by three parameters as event e occurred at time t with degree of accuracy $\mu(e)$: $[t, e, \mu(e)]$.

In another implementation the step of capturing at least one attribute resultant of at least one event that entity goes through includes step of representing each attribute of the plurality of attributes by three parameters as attribute a measured at time t with degree of accuracy $\mu(a)$: $[t, a, \mu(a)]$ wherein the degree of accuracy in the measurement of attributes ranges from 0 to 1, 1 implies that the measurement is 100% correct and 0 says that the measurement is absolutely wrong. Further, adding time and degree of accuracy to the measurement of the plurality of attributes and plurality of events increases the probability of finding sufficient difference from other entity and uniqueness of dynamic digital identity for each entity.

In another implementation the step of capturing at least one event that entity goes through that does not result any attribute includes step of representing the each event of the plurality of events by three parameters as event e occurred at time t with degree of accuracy $\mu(e)$: $[t, e, \mu(e)]$ wherein the degree of accuracy in the measurement of events ranges from 0 to 1, 1 implies that the measurement is 100% correct and 0 says that the measurement is absolutely wrong. Further, adding time and degree of accuracy to the measurement of the plurality of attributes and plurality of events increases the probability of finding sufficient difference from other entity and uniqueness of dynamic digital identity for each entity.

In another implementation the step of generating by the identity module hash value of the attribute data and event data includes step of receiving, by a first processor of the identity module at least one attribute data resultant of at least one event from the entity representation module. The step of generating by the identity module hash value of the attribute data and event data includes step of receiving, by the first processor of the identity module at least one event data that does not result any attribute from the entity representation module. The step of generating by the identity module hash value of the attribute data and event data includes step of processing, by the first processor of the identity module by execution of transition function through at least one cryptographic hash function the attribute data and event data to generate hash value.

In another implementation the step of generating by the identity module new dynamic digital identity of the entity include step of implementing by a second processor of the of the identity module an identity infinite state machine having transition series and present dynamic digital identity.

In another implementation the step of generating by the identity module new dynamic digital identity of the entity includes step of receiving, by the second processor executing identity infinite state machine, as a state transition input parameter a present dynamic digital identity of the entity from the entity representation module. The step of generating by the identity module new dynamic digital identity of the entity includes step of receiving, by the second processor executing identity infinite state machine, as a state transition input parameter the latest determined hash value of the attribute data and event data from the first processor. The step of generating by the identity module new dynamic digital identity of the entity includes step of executing, a transition function of identity chaining machine by the second processor executing identity infinite state machine through application of at least one operator to process the present dynamic digital identity and the latest determined hash value to generate new dynamic digital identity of the entity.

In another implementation in the step of generating by the identity module new dynamic digital identity of the entity the second processor implementing the identity chaining machine having transition series and present dynamic digital identity state executes the transition function through application of concatenation operator, logical operators or any combination of said operators to process the present dynamic digital identity and the latest determined hash value to generate new dynamic digital identity of the entity.

Figure 7:
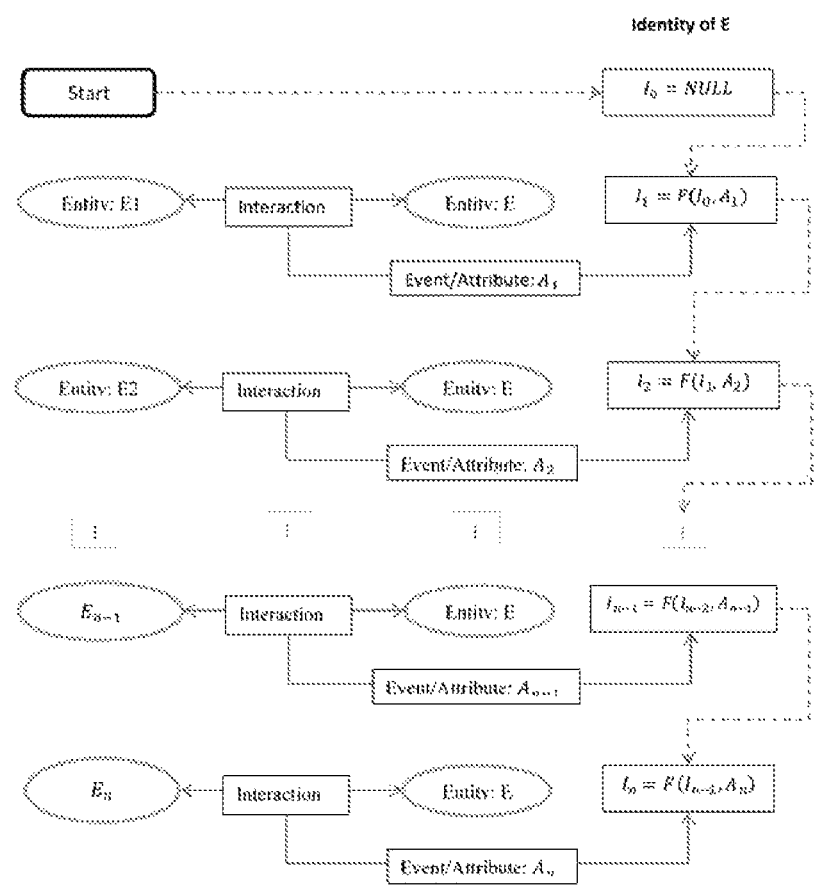
FIG. 7 illustrates a flow chart describing how the dynamic digital identity of an entity E is determined at a time instant t according to an exemplary implementation of the present invention.

FIG. 7 illustrates a flow chart describing how the dynamic digital identity of an entity E is determined at a time instant t according to an exemplary implementation of the present invention.

According to one of the embodiments, the system and method of the present invention, provides better and improved solution of dynamic digital identity for cryptographic e-security by implementing identity chaining machine having incorporated and implemented transition functions i.e. a family of one-to-one functions that chains the attributes of an entity in the order of the creation/measurement of those attributes to advantageously provide dynamic nature of identity as opposed to traditional static nature, ability to accommodate evolving and real time attributes, make the identity self-sovereign: that is the entity has the full control over the identity since it can only be created from its ordered list of attributes which is completely possessed by the entity and make the identity decentralized such that the identity can be created independently from ordered list of attributes. The identity creation process does not depend on any centralized organization.

The present invention as implemented through various embodiments is economically viable and can be adopted by the businesses easily as it provides the higher graded security in economical plans.

In some embodiments, the disclosed techniques can be implemented, at least in part, by computer program instructions encoded on a non-transitory computer-readable storage media in a machine-readable format, or on other non-transitory media or articles of manufacture. Such computing systems (and non-transitory computer-readable program instructions) can be configured according to at least some embodiments presented herein, including the processes shown and described in connection with Figures.

The programming instructions can be, for example, computer executable and/or logic implemented instructions. In some examples, a computing device is configured to provide various operations, functions, or actions in response to the programming instructions conveyed to the computing device by one or more of the computer readable medium, the computer recordable medium, and/or the communications medium. The non-transitory computer readable medium can also be distributed among multiple data storage elements, which could be remotely located from each other. The computing device that executes some or all of the stored instructions can be a microfabrication controller, or another computing platform. Alternatively, the computing device that executes some or all of the stored instructions could be remotely located computer system, such as a server.

Further, while one or more operations have been described as being performed by or otherwise related to certain modules, devices or entities, the operations may be performed by or otherwise related to any module, device or entity.

Further, the operations need not be performed in the disclosed order, although in some examples, an order may be preferred. Also, not all functions need to be performed to achieve the desired advantages of the disclosed system and method, and therefore not all functions are required.

While select examples of the disclosed system and method have been described, alterations and permutations of these examples will be apparent to those of ordinary skill in the art. Other changes, substitutions, and alterations are also possible without departing from the disclosed system and method in its broader aspects.

We claim:

1. A dynamic digital identity creation system, the system comprises:
    an event management module, comprising an event management processor and a memory communicatively coupled to the event management processor, for creating and maintaining events and identity, authenticity of the event;
    an entity representation module, comprising an entity representation processor and an identity storage unit coupled to the entity representation processor, for capturing at least one ordered set of a plurality of attributes resultant of at least one set of events an entity goes through and store and communicate said attributes data, event data respective to said entity, storing and maintaining records of present dynamic digital identity of the each entity;
    an identity module implementing an identity chaining machine, comprising a first identity processor, a second identity processor and an identity memory communicatively coupled to the first identity processor and the second identity processor, and configured to execute at least one transition function to generate hash value of the attribute data and event data by processing the attribute data and event data through at least one cryptographic hash function, process the present dynamic digital identity and a latest determined hash value to generate new dynamic digital identity of the entity.

2. The system as claimed in claim 1, wherein the event management processor is configured to create and maintain events involving at least one entity based on input interaction data from the at least one entity involved in the interaction; maintain identity, authenticity, integrity and non-deniability of the event.

3. The system as claimed in claim 1, wherein the entity representation processor is configured to capture at least one ordered set of a plurality of attributes resultant of at least one set of events an entity goes through and store said attributes data, event data respective to said entity at the identity storage unit, the plurality of attributes created, measured at different time 't' with a degree of accuracy u (a); capture at least one set of events that does not result any attributes and store said events data respective to said entity at the identity storage unit, the at least one set of events occurred and measured/recorded at time 't' with a degree of accuracy u (e); communicate attributes data specific to events and the events information; store and maintain records of present identity of the each entity at the identity storage unit.

4. The system as claimed in claim 1, wherein the identity module implementing identity chaining machine and configured to execute transition function comprises:
    the first identity processor configured to receive at least one attribute data resultant of at least one event from the entity representation module; receive at least one event data that does not result any attribute from the entity representation module; execute, a transition function to generate hash value of the attribute data and event data by processing the attribute data and event data through at least one cryptographic hash function;
    the second identity processor implementing the identity chaining machine having transition series and present dynamic digital identity state configured to receive as a state transition input parameter a present dynamic digital identity of the entity from the entity representation module; receive as a state transition input parameter a latest determined hash value of the attribute data and event data from the first identity processor;

execute, a transition function through application of at least one operator to process the present dynamic digital identity and the latest determined hash value to generate new dynamic digital identity of the entity; communicate the new dynamic digital identity of the entity to the entity representation module to update the dynamic digital identity record of said entity.

5. The system as claimed in claim 1, wherein said event management module, comprising the event management processor, is configured to maintain the identity, authenticity, integrity and non-deniability of the event by accepting by said event management processor collectively a plurality of digital signatures of all the involved entities when the event is created from at least one digital signature input device.

6. The system as claimed in claim 1, wherein the each attribute of the plurality of attributes is represented by three parameters as attribute a measured at time t with degree of accuracy $\mu(a)$: [t, a, $\mu(a)$].

7. The system as claimed in claim 1, wherein the each event of the plurality of events is represented by three parameters as event e occurred at time t with degree of accuracy $\mu(e)$: [t, e, $\mu(e)$].

8. The system as claimed in claim 1, wherein the degree of accuracy in the measurement of attributes and events ranges from 0 to 1, 1 implies that the measurement is 100% correct and 0 says that the measurement is absolutely wrong.

9. The system as claimed in claim 1, wherein adding time and degree of accuracy to the measurement of the plurality of attributes and plurality of events increases the probability of finding sufficient difference from other entity and uniqueness of dynamic digital identity for each entity.

10. The system as claimed in claim 1, wherein the second identity processor implementing the identity chaining machine having transition series and present dynamic digital identity state configured to execute, a transition function through application of concatenation operator, logical operators or any combination of said operators to process the present dynamic digital identity and a latest determined hash value to generate new dynamic digital identity of the entity.

11. A method for creation of dynamic digital identity, said method comprising steps of:
creating and maintaining by an event management module, comprising an event management processor and a memory communicatively coupled to the event management processor, at least one event involving at least one entity, the events arranged in the increasing order of time at which said events were measured;
maintaining authenticity, integrity, and non-deniability of the event;
storing and maintaining by an entity representation module, comprising an entity representation processor and an identity storage unit communicatively coupled to the processor, records of present dynamic digital identity of each entity;
capturing by the entity representation module at least one attribute resultant of at least one event that entity goes through;
capturing by the entity representation module at least one event that entity goes through that does not result any attribute;
receiving at an identity module, comprising a first identity processor, a second identity processor and an identity memory communicatively coupled to the first identity processor and the second identity processor, at least one attribute data resultant of at least one event and at least one event data;
generating by the identity module a hash value of the attribute data and event data by processing through transition function by the first identity processor of the identity module the attribute data and event data through at least on cryptographic function;
receiving at the identity module a present dynamic digital identity of the entity from the entity representation module;
generating by the identity module new dynamic digital identity of the entity by processing through transition function by the second identity processor of the identity module the present dynamic digital identity and a latest determined hash value of the attribute data and event data;
communicating the new dynamic digital identity of the entity to the entity representation module to update the dynamic digital identity record of said entity;
repeating the process steps to generate new dynamic digital identity at measuring and recording an event at the event management module.

12. The method as claimed in claim 11, wherein the events created and maintained by the event management module involving at least one entity are based on the input interaction data from the at least one entity involved in the interaction.

13. The method as claimed in claim 11, wherein the step of maintaining identity, authenticity, integrity, and non-deniability of the event includes steps of collectively signing (digitally) the occurrence of event by all involved entities using digital signatures.

14. The method as claimed in claim 11, wherein the step of capturing at least one attribute resultant of at least one event that entity goes through includes step of representing each attribute of a plurality of attributes by three parameters as attribute a measured at time t with degree of accuracy $\mu(a)$: [t, a, $\mu(a)$].

15. The method as claimed in claim 11, wherein the step of capturing at least one event that entity goes through that does not result any attribute includes step of representing the each event of a plurality of events by three parameters as event e occurred at time t with degree of accuracy $\mu(e)$: [t, e, $\mu(e)$].

16. The method as claimed in claim 11, wherein the degree of accuracy in the measurement of attributes and events ranges from 0 to 1, 1 implies that the measurement is 100% correct and 0 says that the measurement is absolutely wrong.

17. The method as claimed in claim 11, wherein adding time and degree of accuracy to the measurement of the plurality of attributes and plurality of events increases the probability of finding sufficient difference from other entity and uniqueness of dynamic digital identity for each entity.

18. The method as claimed in claim 11, wherein, the step of generating by the identity module hash value of the attribute data and event data include steps of: receiving, by a first identity processor at least one attribute data resultant of at least one event from the entity representation module; receiving, by the first identity processor at least one event data that does not result any attribute from the entity representation module; processing, by the first identity processor by execution of transition function through at least one cryptographic hash function the attribute data and event data to generate hash value.

19. The method as claimed in claim 11, wherein, the step of generating by the identity module new dynamic digital identity of the entity include step of implementing by a second identity processor an identity infinite state machine having transition series and present dynamic digital identity.

20. The method as claimed in claim 11, wherein, the step of generating by the identity module new dynamic digital identity of the entity include steps of: receiving, by the second identity processor executing identity infinite state machine, as a state transition input parameter a present dynamic digital identity of the entity from the entity representation module; receiving, by the second identity processor executing identity infinite state machine, as a state transition input parameter a latest determined hash value of the attribute data and event data from the first identity processor, executing a transition function of identity chaining machine by the second identity processor executing identity infinite state machine through application of at least one operator to process the present dynamic digital identity and the latest determined hash value to generate new dynamic digital identity of the entity.

21. The method as claimed in claim 11, wherein the second identity processor implementing the identity chaining machine having transition series and present dynamic digital identity state executes the transition function through application of concatenation operator, logical operators or any combination of said operators to process the present dynamic digital identity and a latest determined hash value to generate new dynamic digital identity of the entity.

* * * * *